United States Patent
Park

(10) Patent No.: US 12,089,157 B2
(45) Date of Patent: Sep. 10, 2024

(54) APPLIANCE, APPLIANCE NETWORK SYSTEM, AND CONNECTION METHOD THEREOF

(71) Applicant: Samsung Electronics Co., Ltd., Suwon-si (KR)

(72) Inventor: Hyungryoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 17/698,792

(22) Filed: Mar. 18, 2022

(65) Prior Publication Data

US 2022/0210740 A1    Jun. 30, 2022

Related U.S. Application Data

(63) Continuation of application No. PCT/KR2020/012268, filed on Sep. 11, 2020.

(30) Foreign Application Priority Data

Sep. 19, 2019 (KR) ........................ 10-2019-0115422

(51) Int. Cl.
H04W 52/02 (2009.01)
H04W 52/36 (2009.01)

(52) U.S. Cl.
CPC ..... *H04W 52/0229* (2013.01); *H04W 52/028* (2013.01); *H04W 52/367* (2013.01)

(58) Field of Classification Search
USPC ........... 455/41.2, 41.3, 418–420, 343.5, 522, 455/552.1, 553.1; 370/318
See application file for complete search history.

(56) References Cited

U.S. PATENT DOCUMENTS 9,622,023 B2    4/2017 Goel et al.
2010/0093280 A1 4/2010 Ahn et al.
(Continued)

FOREIGN PATENT DOCUMENTS

EP          3226623 A1   10/2017
JP       2016-529757 A    9/2016
(Continued)

OTHER PUBLICATIONS

International Search Report and Written Opinion of the International Searching Authority dated Dec. 21, 2020, in connection with International Application No. PCT/KR2020/012268, 10 pages.

*Primary Examiner* — Suhail Khan

(57) ABSTRACT

Provided is an appliance network system capable of minimizing power consumption of an appliance by turning on a WiFi module of the appliance when required, the appliance network system including a terminal device, a server configured to receive an appliance control command from the terminal device and transmit the received appliance control command to a hub device, the hub device configured to, in response to receiving the appliance control command from the server, transmit a wake-up signal to an appliance through Bluetooth communication, and the appliance including a wireless fidelity (WiFi) module and a Bluetooth module, and configured to, in response to receiving the wake up signal from the hub device by the Bluetooth module, turn on the WiFi module from an off state.

20 Claims, 8 Drawing Sheets

(56) References Cited

U.S. PATENT DOCUMENTS

| | | | |
|---|---|---|---|
| 2014/0308898 A1 | 10/2014 | Lee et al. | |
| 2016/0105789 A1 | 4/2016 | Chae | |
| 2016/0127989 A1 | 5/2016 | Zhang et al. | |
| 2017/0086097 A1 | 3/2017 | Wasily | |
| 2018/0167874 A1* | 6/2018 | Ofir | H04W 4/20 |

FOREIGN PATENT DOCUMENTS

| | | |
|---|---|---|
| KR | 10-2010-0042048 A | 4/2010 |
| KR | 10-2014-0124304 A | 10/2014 |
| KR | 10-2016-0041620 A | 4/2016 |
| KR | 20-0292430 Y1 | 4/2016 |

* cited by examiner

APPLIANCE, APPLIANCE NETWORK SYSTEM, AND CONNECTION METHOD THEREOF

CROSS-REFERENCE TO RELATED APPLICATIONS

This application is a Bypass Continuation of International Application No. PCT/KR2020/012268, filed Sep. 11, 2020, which claims priority to Korean Patent Application No. 10-2019-0115422, filed Sep. 19, 2019, the disclosures of which are herein incorporated by reference in their entirety.

BACKGROUND

1. Field

The disclosure relates to an appliance, an appliance network system, and a connection method thereof that are capable of minimizing power consumption.

2. Description of Related Art

In general, a user may control an appliance in an indoor area using a terminal device. To this end, the terminal device and the appliance need to perform wireless communication therebetween.

In this case, in order for the user to control the appliance in the indoor area from the outside, the appliance need to always be connected to a Wide Area Network (WAN), which requires a wireless fidelity (WiFi) module of the appliance to be always maintained in an on state.

In addition, when an appliance performs Bluetooth communication with an external Bluetooth device, the appliance, in order to perform an initial connection and maintain connection with the external Bluetooth device, needs to always output a Bluetooth signal at a maximum strength value.

Accordingly, the appliance in a standby state has a considerable power consumption.

SUMMARY

One aspect of the disclosure provides an appliance, an appliance network system, and a connection method thereof, in which the appliance turns on a wireless-fidelity (WiFi) mode in response to an external terminal device attempting a connection based on a server of a Wide Area Network (WAN) while in an off state of the WiFi module, and outputs a Bluetooth signal at a strength value that is optimal for Bluetooth communication with a terminal device.

According to an aspect of the disclosure, there is provided an appliance including: a WiFi module configured to perform wireless fidelity (WiFi) communication with an access point (AP) and communicate with a terminal device through the AP; a Bluetooth module configured to perform Bluetooth communication with a Bluetooth device that, in response to receiving an appliance control command transmitted from the terminal device, transmits a wake-up signal to the appliance; and a controller configured to, in response to receiving the wake up signal by the Bluetooth module, turn on the WiFi module in an off state.

The controller may be configured to, upon the WiFi module not receiving an appliance control command for controlling the appliance from the terminal device within a preset time, turn off the WiFi module.

The appliance may further include a storage in which a value of strength of a Bluetooth signal, wherein the controller may be configured to, while increasing or decreasing a strength of the Bluetooth signal output by the Bluetooth module, determine a minimum value of the Bluetooth signal at which the Bluetooth module is connected to the Bluetooth device, and the storage may be configured to store the determined minimum value of the Bluetooth signal.

The controller may be configured to, upon a connection of the Bluetooth module to the Bluetooth device, decrease the strength of the Bluetooth signal output by the Bluetooth module, and upon a cancellation of the connection between the Bluetooth module and the Bluetooth device during the decreasing of the strength of the Bluetooth signal, increase the strength of the Bluetooth signal output by the Bluetooth module.

The controller may be configured to, upon a connection of the Bluetooth module to the Bluetooth device during the increasing of the strength of the Bluetooth signal, determine the strength of the Bluetooth signal output by the Bluetooth module as the minimum value.

The controller may be configured to, upon a connection of the Bluetooth module to the Bluetooth device during the increasing of the strength of the Bluetooth signal, maintain the strength of the Bluetooth signal output by the Bluetooth module.

The controller may be configured to determine a value of strength for the Bluetooth signal output by the Bluetooth module, based on a plurality of the values of strength of the Bluetooth signal stored in the storage.

The controller may be configured to control the Bluetooth module to output the Bluetooth signal having the determined value of strength.

According to another aspect of the disclosure, there is provided an appliance network system including: a terminal device; a server configured to receive an appliance control command from the terminal device and transmit the received appliance control command to a hub device; the hub device configured to, in response to receiving the appliance control command from the server, transmit a wake-up signal to an appliance through Bluetooth communication; and the appliance including a wireless fidelity (WiFi) module and a Bluetooth module, and configured to, in response to the Bluetooth module receiving the wake up signal from the hub device, switch the WiFi module in an off state to an on state.

The appliance may be configured to, in response to not receiving the appliance control command from the terminal device within a preset time, turn off the WiFi module.

The appliance may be configured to turn on the WiFi module to receive a WiFi signal from the hub device or an access point (AP).

The hub device may be provided with an AP module to serve as an AP.

The appliance may be located within a preset radius based on the hub device.

The appliance may be configured to maintain the Bluetooth module in an on state.

According to an aspect of the disclosure, there is provided with a connection method of an appliance network, the connection method including: transmitting, by a terminal device, an appliance control command to a server; receiving, by the server, the appliance control command and transmitting the received appliance control command to a hub device; receiving, by the hub device, the appliance control command from the server; transmitting, by the hub device, a wake up signal to an appliance through Bluetooth communication; receiving, by the appliance including a wireless fidelity (WiFi) module and a Bluetooth module, the wake up signal from the hub device through the Bluetooth module; and turning on, by the appliance, the WiFi module from an off state in response to receiving the wake up signal.

The connection method may further include, in response to the appliance not receiving the appliance control command from the terminal device within a preset time, turning off the WiFi module.

The connection method may further include turning on, by the appliance, the WiFi module, to receive a WiFi signal from the hub device or an access point (AP).

The hub device may be provided with an AP module to serve as an AP.

The appliance may be located within a preset radius based on the hub device.

The appliance may be configured to maintain the Bluetooth module in an on state.

The appliance, the appliance network system, and the connection method thereof according to various embodiments can minimize power consumption of the appliance by turning on a WiFi module of the appliance when required, and also can minimize power consumption of the appliance by outputting a Bluetooth signal having an optimal strength value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
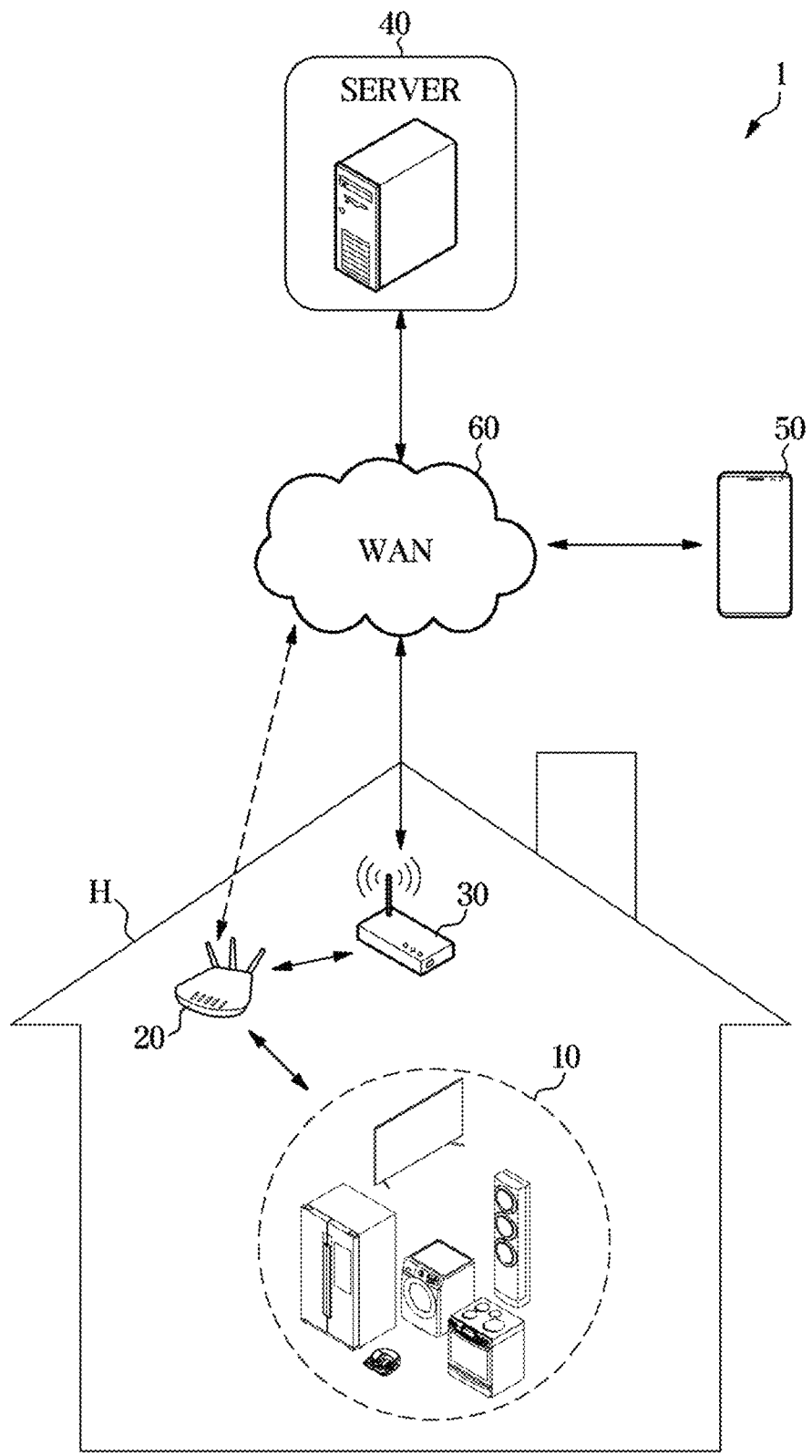
FIG. 1 is a diagram illustrating an appliance network system according to various embodiments of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments described in the present specification and the configurations shown in the drawings are only examples of preferred embodiments of the present disclosure, and various modifications may be made at the time of filing of the present disclosure to replace the embodiments and drawings of the present specification.

It will be further understood that the term "connect" or its derivatives refer both to direct and indirect connection, and the indirect connection includes a connection over a wireless communication network.

The terms used herein are for the purpose of describing the embodiments and are not intended to restrict and/or to limit the present disclosure. For example, the singular expressions herein may include plural expressions, unless the context clearly dictates otherwise. In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may in addition be referred to as a first component.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter, an embodiment according to the disclosure will be described in detail with reference to the accompanying drawings.

FIG. 1 is a diagram illustrating an appliance network system according to various embodiments of the disclosure.

Referring to FIG. 1, an appliance network system 1 according to various embodiments may include an appliance 10 including an wireless fidelity (WiFi) module 12 and a Bluetooth module 11, a hub device 20 configured to receive an appliance control command from a server 40 and transmit the received appliance control command to the appliance 10, an access point (AP) 30 configured to allow the appliance and the hub device 20 to access a Wide Area Network (WAN) 60, the server 40 configured to receive an appliance control command from the terminal device 50 and transmit the received appliance control command to the hub device 20, and the terminal device 50 carried by a user.

The appliance 10 according to certain embodiments may be provided inside home H, and may provide various outputs depending on the type.

Specific, the appliance 10 may include an air conditioner for controlling the indoor temperature of the home H, a television for outputting various types of multimedia information, such as broadcast signals, a refrigerator for refrigerating or freezing food, a cooking device for cooking food, a washing machine for washing or drying clothes, a clothes care machine for drying clothes or removing dust from clothes, a robot cleaner for cleaning inside the home H, and a speaker for outputting sound. However, the type of the appliance 10 is not limited to the above example, and the appliance may include any other device without limitation as long as it can perform a specific operation for the sake of convenience of a user in the home H.

The appliance 10 according to certain embodiments may be connected to the WAN 60 through the AP 30 based on the WiFi module 12 being in an On state, and when the hub device 20 is provided with an AP module 24 and serves as an AP, may be connected the WAN 60 through the hub device 20. In this case, the AP module 24 may include a wired communication module, such as a local area network (LAN) module or a wide area network (WAN) module.

The appliance 10 according to certain embodiments may also perform Bluetooth communication with the hub device 20 and may be located within a predetermined radius based on the hub device 20.

The WAN 60 may include a telecommunications network, for example, at least one of a computer network (e.g., LAN or WAN), the Internet, or a telephone network, through which the appliance 10 may perform communication with other devices, such as the server 40, the hub device 20, and the terminal device 50.

A process in which the appliance 10 according to certain embodiments outputs a Bluetooth signal having an optimal strength value will be described below with reference to FIGS. 3 and 4, and a process in which the appliance 10 is connected to the WAN 60 at the minimum power consumption will be described below with reference to FIGS. 6 to 8.

The hub device 20 according to certain embodiments may be provided inside the home H and provide a home automation service.

For example, the hub device 20 may include an artificial intelligence (AI) speaker equipped with speech recognition-based AI software and an Internet of Things (JOT) function. However, the type of the hub device 20 is not limited to the above example, and the hub device 20 may include all types of network devices for connecting the appliance 10 inside the home H to the WAN 60.

The hub device 20 according to certain embodiments may communicate with the server 40 through the WAN 60 in connection with the AP 30. In addition, the hub device 20 may be provided with the AP module 24 to perform an AP function, and in this case, the hub device 20 may communicate with the server 40 directly through the WAN 60 without needing to be connected to the AP 30.

A detailed configuration of the hub device 20 according to various embodiments will be described below with reference to FIG. 5.

The server 40 according to certain embodiments may communicate with the appliance 10, the hub device 20, and the terminal device 50 through the WAN 60.

Specifically, the server 40 may receive identification information about the hub device 20 and/or the appliance 10 connected to the AP 30 from the AP 30, and may receive an appliance control command from the terminal device 50 and transmit the received appliance control command to the hub device 20 and/or the appliance 10.

The AP 30 may be provided inside the home H and allow the appliance 10 and the hub device 20 to connect to the WAN 60. That is, the appliance 10 and the hub device 20 provided inside the home H may be connected to the WAN 60 through the AP 30 to communicate with the server 40 or the terminal device 50.

To this end, the AP 30 may include a wireless communication module, such as a WiFi module, a Bluetooth module, a Bluetooth low energy (BLE) module, a Zigbee module, a near field communication (NFC) module, wireless broadband internet (Wibro) module, and a wired communication module, such as LAN and WAN. Although the hub device 20 and the AP 30 are separately shown in FIG. 1, when the hub device 20 is provided with an AP module 24 of LAN or WAN, the AP 30 may represent a hub device 20.

The terminal device 50 according to certain embodiments may be an electronic device capable of accessing the WAN 60, and include a videophone, a mobile phone, a smart phone, a wideband code division multiple access (WCDMA) user terminal device, and a universal mobile telecommunication service (UMTS) user terminal device, a personal digital assistant (PDA), a portable multimedia player (PMP), a digital multimedia broadcasting (DMB) user terminal device, an electronic book (E-Book), a portable computer (e.g., a notebook computer, a tablet PC, etc.), an audio-video navigation (AVN) device inside a vehicle, a digital camera, or the like.

In this case, the terminal device 50 may be connected to the WAN 60 in connection to the AP 30 inside the home H, or via a separate communication service (e.g., long term evolution (LTE), LTE Advance (LTE-A), code division multiple access (CDMA), wideband CDMA (WCDMA), universal mobile telecommunications system (UMTS), wireless broadband (Wibro), or global system for mobile communications (GSM)) according to the location of the user. To this end, the terminal device 50 may include a wireless communication module corresponding to each of the communication protocols.

A user may control the appliance 10 in the home H using the terminal device 50 according to certain embodiments. That is, the terminal device 50 may receive an appliance control command to control the appliance 10 in the home H, and transmit the received appliance control command to the server 40 through the WAN 60.

The description in FIG. 1 is made in relation to the appliance 10 provided inside the home H as an example, but the disclosure is not limited thereto. Certain embodiments of the disclosure may be applied without limitation as long as the appliance 10 is provided in a space shared by a plurality of users, such as an office.

In the above, each component constituting the appliance network system 1 has been described. Hereinafter, each construction constituting the appliance network system 1 will be described in detail.

Figure 2:
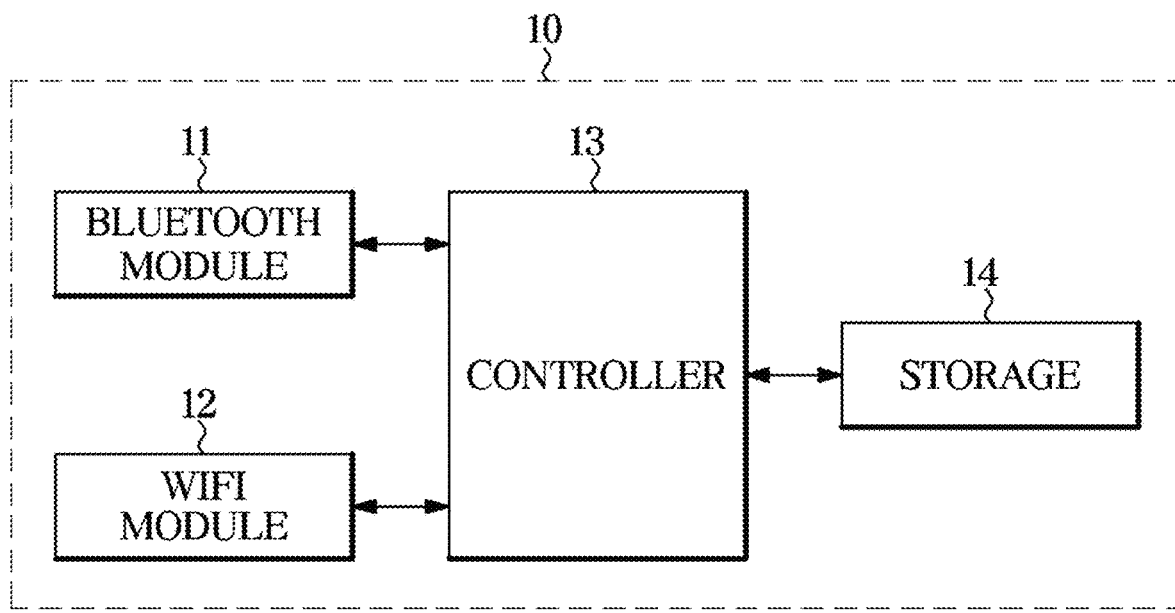
FIG. 2 is a control block diagram illustrating an appliance according to various embodiments of the disclosure.

FIG. 2 is a control block diagram illustrating an appliance according to certain embodiments of the disclosure.

Referring to FIG. 2, an appliance 10 according to certain embodiments may include a Bluetooth module 11 for performing Bluetooth communication with an external Bluetooth device, a WiFi module 12 for performing WiFi communication with the AP 30 and communicating with an external terminal device 50 through the AP 30, a controller 13 for controlling various components of the appliance 10, and a storage 14 for storing various types of information required for controlling the appliance 10.

The Bluetooth module 11 according to certain embodiments may generate a Bluetooth signal to perform Bluetooth communication with the external Bluetooth device. To this end, the Bluetooth module 11 may include an electronic circuit that generates a radio frequency (RF) signal.

In this case, the Bluetooth communication may include Bluetooth and/or Bluetooth low energy (BLE), and the Bluetooth device may include a hub device 20 and/or an AP 30 according to an embodiment. However, the type of the Bluetooth device is not limited to the above example and the Bluetooth device may refer to all types of external devices capable of communicating using Bluetooth and/or Bluetooth low energy.

The WiFi module 12 according to certain embodiments may generate a WiFi signal to perform WiFi communication with the AP 30 and gain access to the AP 30 to communicate with the external terminal device 50 in an indirect manner through the server 40 or in a direct manner. To this end, the WiFi module 12 may include an electronic circuit configured to perform WiFi communication.

In this case, the AP 30 may refer to an AP 30 separately provided inside a home H, and when the hub device 20 is provided with an AP module 24, the AP 30 may refer to the hub device 20. However, the type of the AP 30 is not limited to the above example and the AP 30 may refer to any device including a wireless communication module, such as a WiFi module, and a wired communication module, such as a LAN or WAN module.

The controller 13 according to certain embodiments may control various components of the appliance 10. For example, the controller 13 may turn on/off the Bluetooth module 11, or turn on/off the WiFi module 12. In addition, the controller 13 may control the strength of the Bluetooth signal output from the Bluetooth module 11.

The controller 13 may include at least one memory for storing a program for performing the above-described operation and an operation to be described below, and at least one processor for executing the stored program.

The storage 14 according to certain embodiments may store strength values of the Bluetooth signal output from the Bluetooth module 11. The storage 14 may store the maximum strength value that may be outputtable by the Bluetooth module 11 as a predetermined value, and may store the strength value of the Bluetooth signal output by the Bluetooth module 11 at a time when the Bluetooth module 11 is connected to the appliance 10. That is, the storage 14 may store a plurality of strength values, which will be described below with reference to FIGS. 3 and 4.

To this end, the storage 14 may be implemented as at least one of: a non-volatile memory, such as a cache, read only memory (ROM), a programmable ROM (PROM), an erasable programmable ROM (EPROM), an electrically erasable programmable ROM (EEPROM), and a flash memory; a volatile memory device, such as a random-access memory (RAM), a hard disk drive (HDD), or a CD-ROM. However, the disclosure is not limited thereto, and the storage 14 may be variously provided as long as it can be provided in a type capable of storing various pieces of information.

In the above, each component of the appliance 10 according to certain embodiments has been described. Hereinafter, a process of minimizing the power consumption used for Bluetooth communication of the appliance 10 according to certain embodiments will be described with reference to FIGS. 3 to 4.

Figure 3:
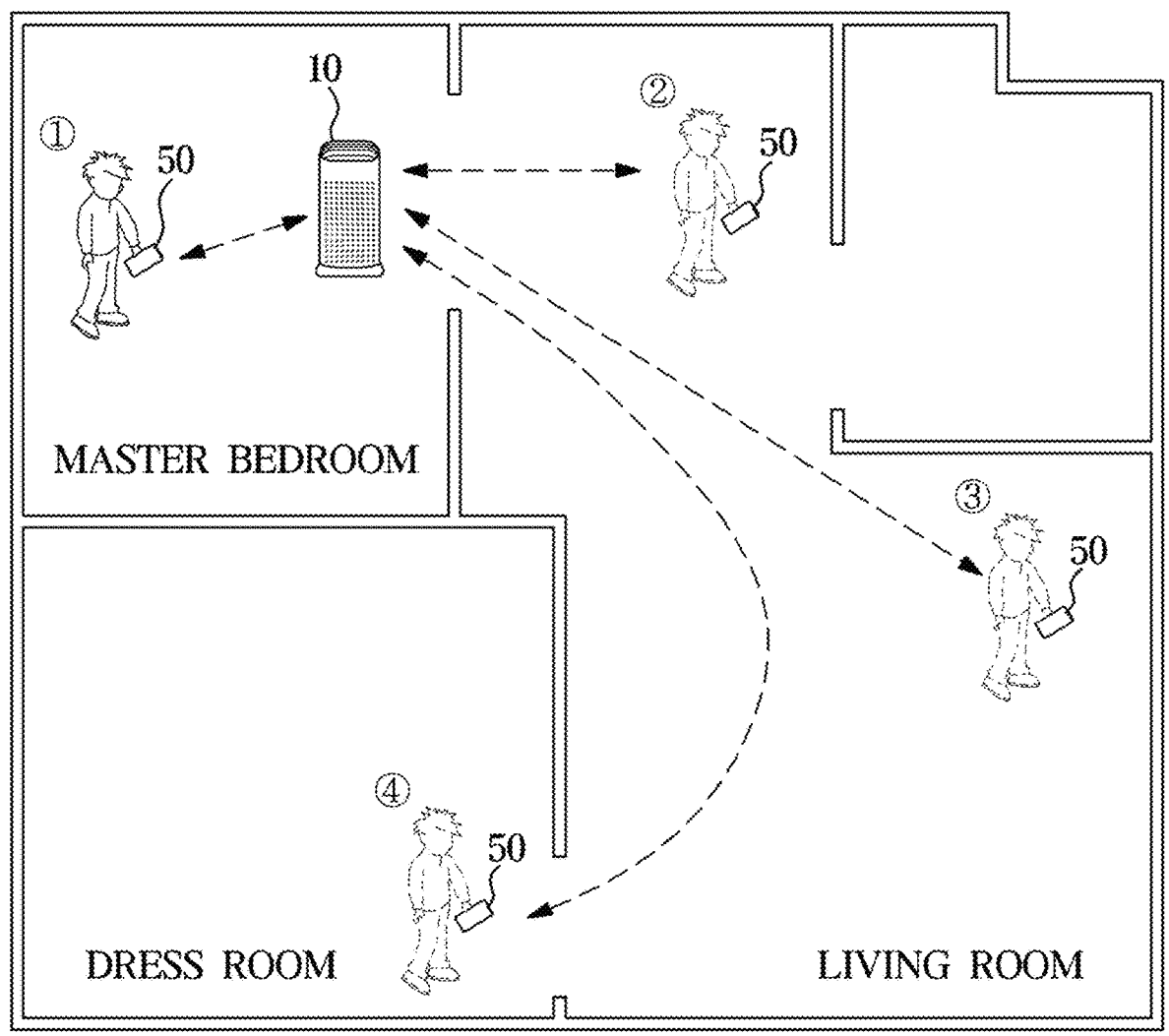
FIG. 3 is a diagram illustrating a case in which an appliance performs Bluetooth communication with an external terminal device according to various embodiments of the disclosure.
Figure 4:
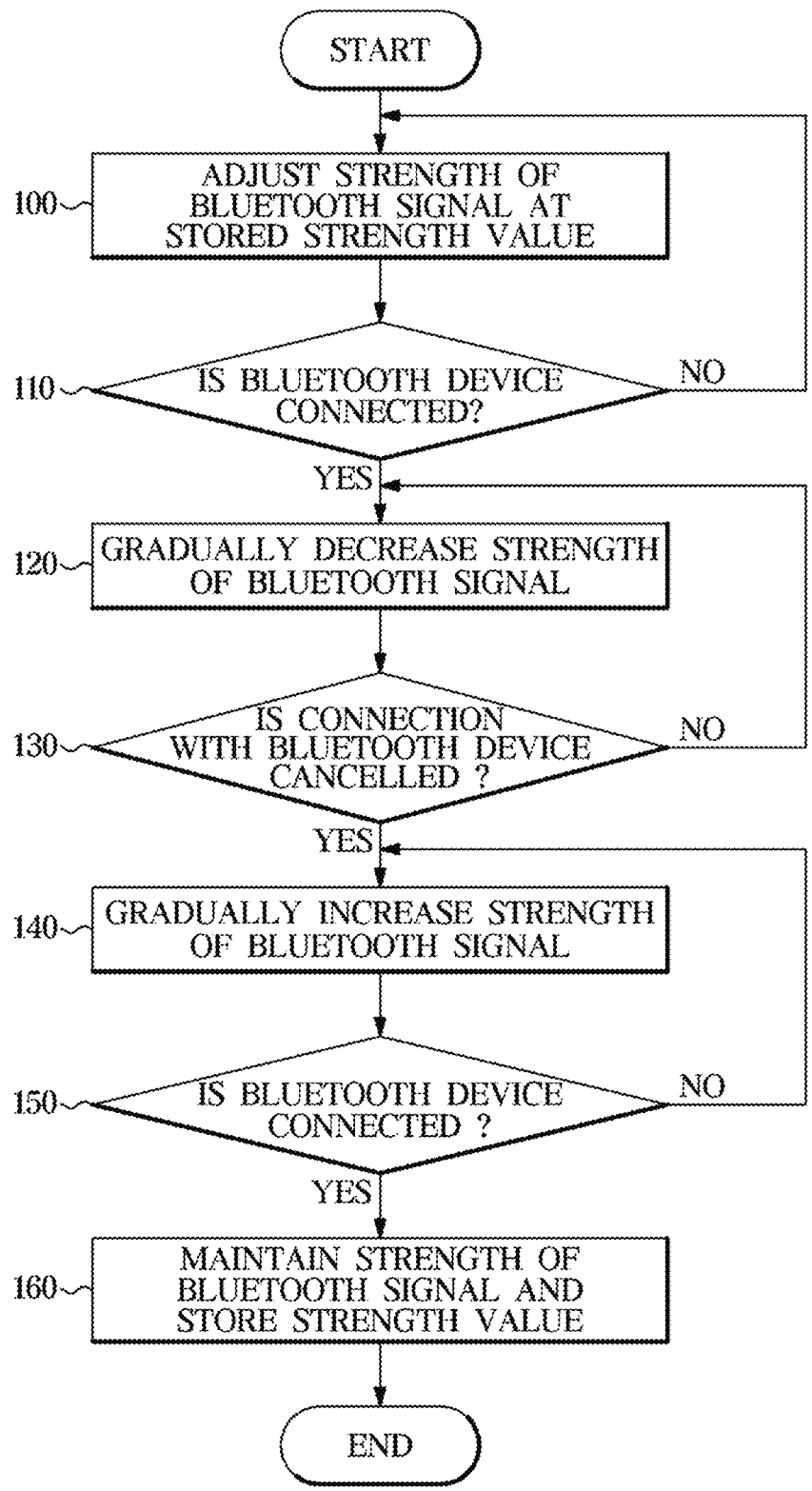
FIG. 4 is a control flowchart of an appliance according to various embodiments of the disclosure.

FIG. 3 is a diagram illustrating a case in which an appliance performs Bluetooth communication with an external terminal device according to certain embodiments of the disclosure, and FIG. 4 is a control flowchart of an appliance according to certain embodiments of the disclosure.

Referring to FIG. 3, an appliance 10 according to certain embodiments is located in a master bedroom inside a home H. In addition, FIG. 3 illustrates a first case in which a user carrying a Bluetooth device, e.g., a terminal device 50, is located in the master bedroom (hereinafter referred to as 'position 1'), a second case in which the user is located on an upper portion in a living room (hereinafter referred to as 'position 2'), a third case in which the user is located on a lower portion in the living room (hereinafter referred to as 'position 3'), and a fourth case in which the user is located in a dressing room (hereinafter referred to as 'position 4').

Referring to FIG. 4, a controller 13 included in the appliance 10 according to certain embodiments may adjust the strength of the Bluetooth signal output by a Bluetooth module 11 at the strength value stored in the storage 14 such that the Bluetooth module 11 may communicate and connect to the Bluetooth device (operation 100). In this case, the Bluetooth device may refer to the user terminal device 50.

The storage 14 may store the maximum strength value that is outputtable by the Bluetooth module 11 as a predetermined value. That is, when the Bluetooth module 11 of the appliance 10 has not been connected to the external Bluetooth device before, the controller 13 may control the strength of the Bluetooth signal output from the Bluetooth module 11 at the maximum strength value. Hereinafter, for the sake of convenience in description, the Bluetooth module 11 of the appliance 10 has never been connected to the external Bluetooth device.

Because the Bluetooth module 11 of the appliance 10 outputs a Bluetooth signal of the maximum strength value, the Bluetooth module 11 of the appliance 10 may be connected to the Bluetooth device in all of the cases of FIG. 3.

The controller 13 of the appliance 10 according to certain embodiments may identify whether the Bluetooth module 11 is connected to the Bluetooth device (operation 110), and, in response to identifying that the Bluetooth module 11 is not connected to the Bluetooth device ("No" in operation 110), may continuously control the strength of the Bluetooth signal at the maximum value.

In response to identifying that the Bluetooth module 11 is connected to the Bluetooth device ("Yes" in operation 110), the controller 13 may gradually decrease the strength of the Bluetooth signal output by the Bluetooth module 11 (operation 120). As the strength of the Bluetooth signal output from the Bluetooth module 11 of the appliance 10 gradually decreases, the connections between the Bluetooth module 11 and the Bluetooth device may be canceled in the order of the fourth case, the third case, the second case, and the first case.

The controller 13 may identify whether the connection between the Bluetooth module 11 and the Bluetooth device is canceled (operation 130), and gradually decrease the strength of the Bluetooth signal until the connection between the Bluetooth module 11 and the Bluetooth device is cancelled ("No" in operation 130).

In response to identifying that the connection between the Bluetooth module 11 and the Bluetooth device is canceled during the decreasing of the strength of the Bluetooth signal, the controller 13 may gradually increase the strength of the Bluetooth signal output from the Bluetooth module 11 (operation 140). In this case, the storage 14 may store the strength value of the Bluetooth signal output by the Bluetooth module 11 at the time when the connection between the Bluetooth module 11 and the Bluetooth device is canceled.

That is, the storage 14 may store the strength values that have a larger value in the order of the fourth case, the third case, the second case, and the first case of FIG. 3.

Thereafter, the controller 13 may identify whether the Bluetooth module 11 is connected to the Bluetooth device during the increasing of the strength of the Bluetooth signal (operation 150), and gradually increase the strength of the Bluetooth signal until the Bluetooth module 11 is connected to the Bluetooth device ("No" in operation 150).

In response to identifying that the Bluetooth module 11 is connected the Bluetooth device during the increasing of the strength of the Bluetooth signal, the controller 13 may maintain the strength of the Bluetooth signal output from the Bluetooth module 11, and the storage 14 may store the value of the maintained strength of the Bluetooth signal (operation 160).

Similar to the above, the storage 14 may store the strength values that have a larger value in the order of the fourth case, the third case, the second case, and the first case of FIG. 3. The controller 13 and the storage 14 repeatedly perform the process shown in FIG. 4 whenever the Bluetooth module 11 is connected to the Bluetooth device, to thereby derive an optimal strength value of the Bluetooth signal that may ensure success of connection between the appliance 10 and the Bluetooth device while minimizing the power consumption. That is, the controller 13 may determine the strength value of the Bluetooth signal output by the Bluetooth module based on a plurality of strength values stored in the storage 14, and control the Bluetooth module 11 to output the Bluetooth signal having the determined strength value. Specifically, the controller 13 may determine an optimal strength value based on the plurality of strength values stored in the storage 14, and adjust the strength of the signal output by the Bluetooth module 11 to the determined optimal strength value such that the Bluetooth module 11 is connected to the Bluetooth device.

For example, when the Bluetooth module 11 and the terminal device 50 are connected ten times in 'position 1', five times in 'position 2', three times in 'position 3', and one time in 'position 4' of FIG. 3, the storage 14 may store ten strength values of the Bluetooth signal at which the terminal device 50 located at 'position 1' is connectable to the Bluetooth module, five strength values of the Bluetooth signal at which the terminal device 50 located at 'position 2' is connectable to the Bluetooth module, three strength values of the Bluetooth signal at which the terminal device 50 located at 'position 3' is connectable to the Bluetooth module, and one strength values of the Bluetooth signal at which the terminal device 50 located at 'position 4' is connectable to the Bluetooth module. In this case, the controller 13 may determine the optimal strength value by a method of obtaining an average value of the plurality of strength values stored in the storage 14, or the like, and may control the Bluetooth module 11 to output a Bluetooth signal having the determined optimal strength value.

As described above, the appliance 10 according to certain embodiments may determine the optimal strength value by adjusting the strength of the Bluetooth signal, and output a Bluetooth signal having the determined optimal strength value so that the power consumption of the appliance 10 may be minimized.

In the above, the process of minimizing the power of the appliance 10 consumed for Bluetooth communication according to certain embodiments has been described.

Hereinafter, components of a hub device 20 will be described with reference to FIG. 5, and a process of minimizing power of an appliance 10 consumed for WiFi communication according to an embodiment will be described with reference to FIGS. 6 to 8.

Figure 5:
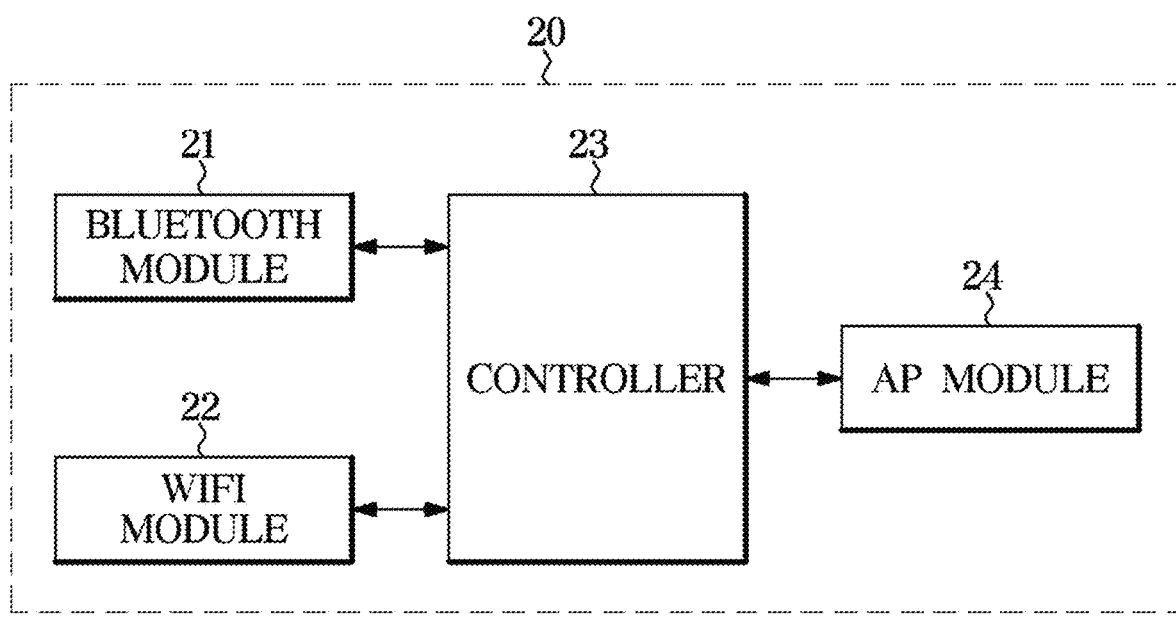
FIG. 5 is a control block diagram of a hub device according to various embodiments of the disclosure.

FIG. 5 is a control block diagram of a hub device according to various embodiments of the disclosure. The hub device 20 according to certain embodiments may include a Bluetooth module 21 performing Bluetooth communication with an appliance 10, a WiFi module 22 performing WiFi communication to gain access to an AP 30 and connect to an WAN 60, a controller 23 configured to, in response to receiving an appliance control command from a server 40, control the Bluetooth module 21 to transmit a wake-up signal through Bluetooth communication, and an AP module 24 including a wired communication module.

The Bluetooth module 21 of the hub device 20 according to certain embodiments may transmit a wake-up signal to the appliance 10 under the control of the controller 23. In this case, the wake-up signal may represent all types of signals including a command to switch a WiFi module 12 of the appliance 10 into an on state.

The WiFi module 22 of the hub device 20 according to certain embodiments may be connected to the AP 30 by performing WiFi communication, and receive an appliance control command from the server 40 using the WAN 60. In this case, the appliance control command may include various appliance control commands required for an external terminal device 50 to control the appliance 10 in the home H, for example, a command for connecting the terminal device 50 to the appliance and a command for controlling the operation of the appliance 10.

The hub device 20 according to certain embodiments may receive an appliance control command from the server 40, transmit the appliance control command to the controller 23, and when the transmitted appliance control command is a command to connect the terminal device 50 to the appliance 10, the hub device 20 may control the Bluetooth module 21 to transmit a wake-up signal to the appliance 10.

Although an AP module 24 is illustrated in FIG. 5, the AP module is a component that may be omitted, and when the hub device 20 according to certain embodiments is provided with an AP module 24, the AP module 24 of the hub device 20 may directly receive the appliance control command from the server 40. In this case, the AP module 24 included in the hub device 20 may receive the appliance control command from the server 40 and transmit the received appliance control command to the controller 23.

Figure 6:
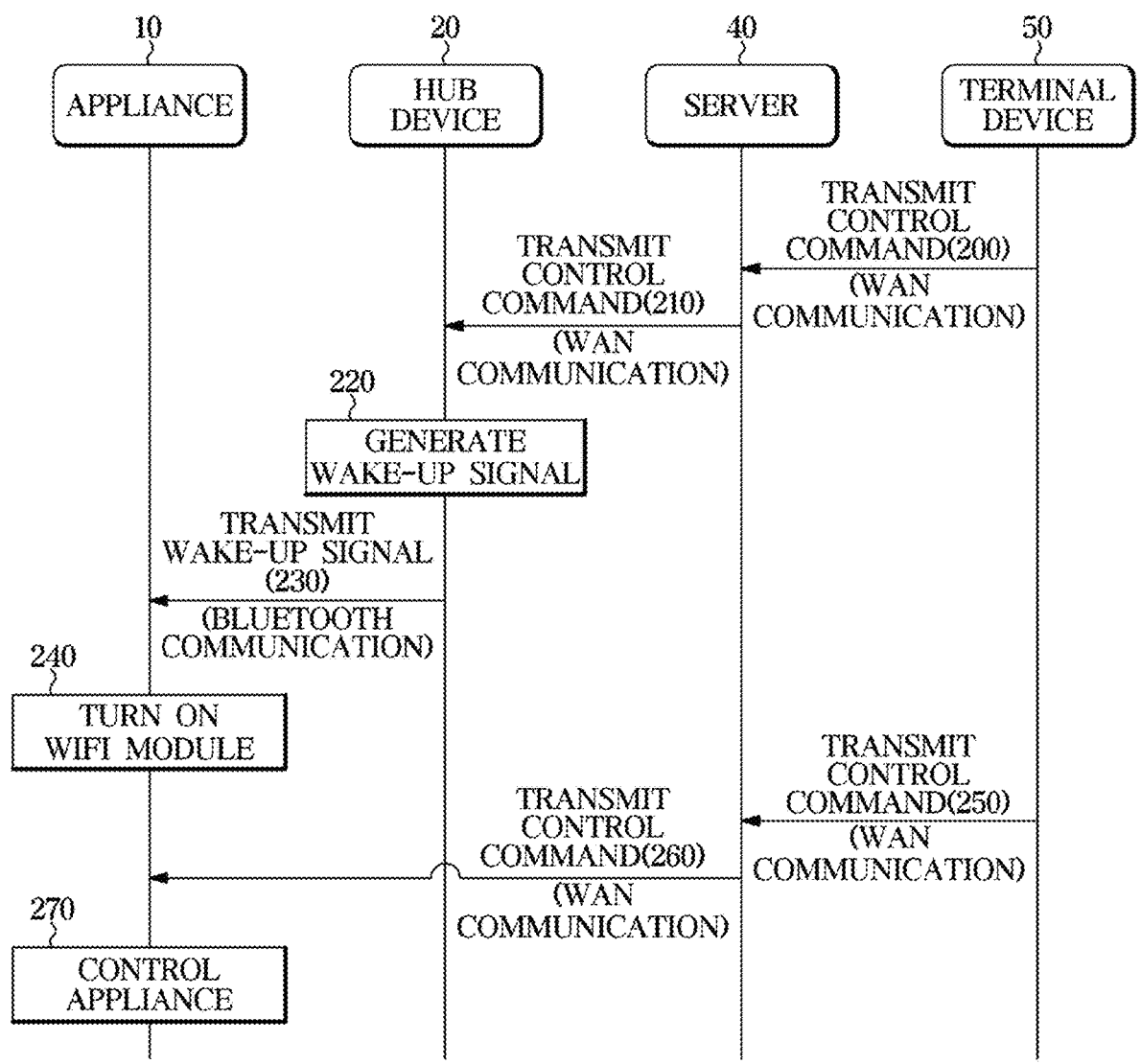
FIG. 6 is a block diagram illustrating a control signal flow of an appliance network system according to various embodiments of the disclosure.
Figure 7:
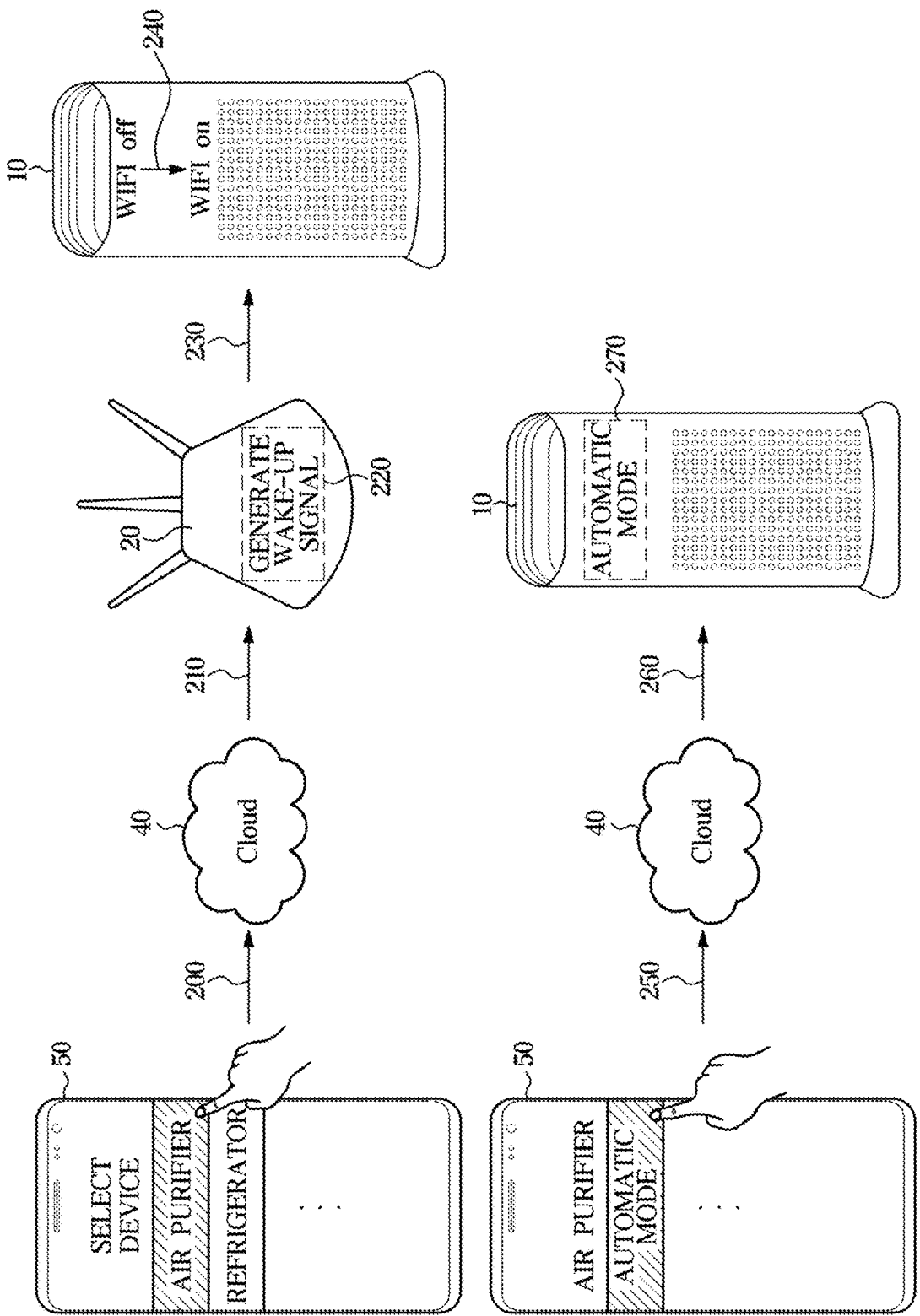
FIG. 7 is a diagram schematically illustrating a control signal flow of an appliance network system according to various embodiments of the disclosure.

FIG. 6 is a block diagram illustrating a control signal flow of an appliance network system according to an embodiment of the disclosure, and FIG. 7 is a diagram schematically illustrating a control signal flow of an appliance network system according to an embodiment of the disclosure.

Referring to FIGS. 6 to 7, an appliance network system 1 according to various embodiments may include a terminal device 50, a server 40 receiving an appliance control command from the terminal device 50 and transmitting the received appliance control command to a hub device 20, the hub device 20 receiving the appliance control command from the server 40 and transmitting the received appliance control command to an appliance 10, and the appliance 10.

The terminal device 50 according to certain embodiments may receive an appliance control command for controlling the appliance 10 input from a user and transmit the received appliance control command to the server 40 using the WAN 60 (operation 200). In this case, the appliance control command for controlling the appliance 10 may be a command for the user to select one of the appliances 10 to be controlled. For example, the appliance control command according to certain embodiments may be a command for the user to select an air purifier 10 that is one of the appliances 10. However, the appliance control command is not limited thereto, and when the appliance 10 to be controlled is already selected, the appliance control command may include a command to substantially control the appliance 10.

The server 40 according to certain embodiments may receive the appliance control command from the terminal device 50 and transmit the received appliance control command to the hub device 20 (operation 210). In this case, the server 40 may transmit the appliance control command to the hub device 20 using the WAN 60.

The hub device 20 according to certain embodiments may, in response to receiving the appliance control command from the server 40, generate a wake-up signal for turning on a WiFi module 12 of the appliance 10 (operation 220). For example, the hub device 20 may, in response to receiving an appliance control command for selecting the air purifier 10 through the server 40, generate a wake-up signal for turning on the WiFi module 12 of the air purifier 10. Thereafter, the hub device 20 may transmit the generated wake-up signal to the appliance 10 through Bluetooth communication (operation 230). As described above, Bluetooth communication may refer to communication using a Bluetooth signal or a Bluetooth low energy signal, and may be distinguished from communication using the WAN 60.

The appliance 10 according to certain embodiments may, upon receiving the wake-up signal from the hub device 20, switch the WiFi module 12 from an off state to an on-state (operation 240). That is, a Bluetooth module 11 of the appliance 10 may receive the wake-up signal from the hub device 20. To this end, the appliance 10 may maintain the Bluetooth module 11 of the appliance 10 in an on state. In addition, the appliance 10 may be located within a predetermined radius with respect to the hub device 20 to perform Bluetooth communication with the hub device 20.

For example, the air purifier 10 may maintain the Bluetooth module 11 in an on state, and in response to receiving a wake-up signal from the hub device 20 through Bluetooth communication, may switch the WiFi module 12 to an on state.

The appliance 10 according to certain embodiments may switch the WiFi module 12 to an on state, to receive a WiFi signal from the hub device 20 or the AP 30 and perform communication using the WAN 60. For example, the air purifier 10 may switch the WiFi module 12 to an on state, to receive a WiFi signal from the hub device 20 or the AP 30 and perform communication using the WAN 60.

Thereafter, the terminal device 50 according to certain embodiments may receive an appliance control command for substantially controlling the appliance 10 from the user and transmit the received appliance control command to the server 40 (operation 250). For example, the terminal device 50 may receive an appliance control command for operating the air purifier in an automatic mode and transmit the received appliance control command to the server 40. However, when the appliance control command to substantially control the appliance 10 has already been transmitted (operation 200), the control command transmission process 250 may be omitted.

The server 40 according to certain embodiments may receive the appliance control command for substantially controlling the appliance 10 from the terminal device 50 and transmit the received appliance control command to the appliance 10 (operation 260). In this case, the WiFi module 12 of the appliance 10 is in an on state, and thus the server 40 may transmit the appliance control command through wide area communication using the WAN 60. In response to an appliance control command for substantially controlling the appliance 10 having already been transmitted from the terminal device 50 (operation 200), the server 40 may re-transmit the stored appliance control command (operation 260) without an additional reception (operation 250) of an appliance control command from the terminal device 50.

Specifically, the server 40 according to certain embodiments may transmit the appliance control command to the appliance 10 through the AP 30 or the hub device 20 to which the appliance 10 is connected.

The appliance 10 according to certain embodiments may, in response to receiving the appliance control command to control the appliance 10 using the WAN 60, control the appliance 10 based on the received appliance control command (operation 270). For example, the air purifier 10 may operate the air purifier 10 in an automatic mode based on an appliance control command to operate the air purifier 10 in an automatic mode.

Thereafter, the appliance 10 according to certain embodiments may, in response to not receiving an appliance control command from the terminal device 50 within a predetermined time, switch the WiFi module 12 to an off state to minimize the power consumption. In this case, the off state of the WiFi module 12 may include a state in which the WiFi module 12 is completely inoperable, as well as a sleep state of the WiFi module 12. That is, in the disclosure, the turning off the WiFi module 12 may include allowing the WiFi module 12 not to operate or switching the WiFi module 12 to a sleep state.

This will be described below in detail with reference to FIG. 8. FIG. 8 is a flowchart illustrating a part of a control method of an appliance network system according to various embodiments of the disclosure.

Figure 8:
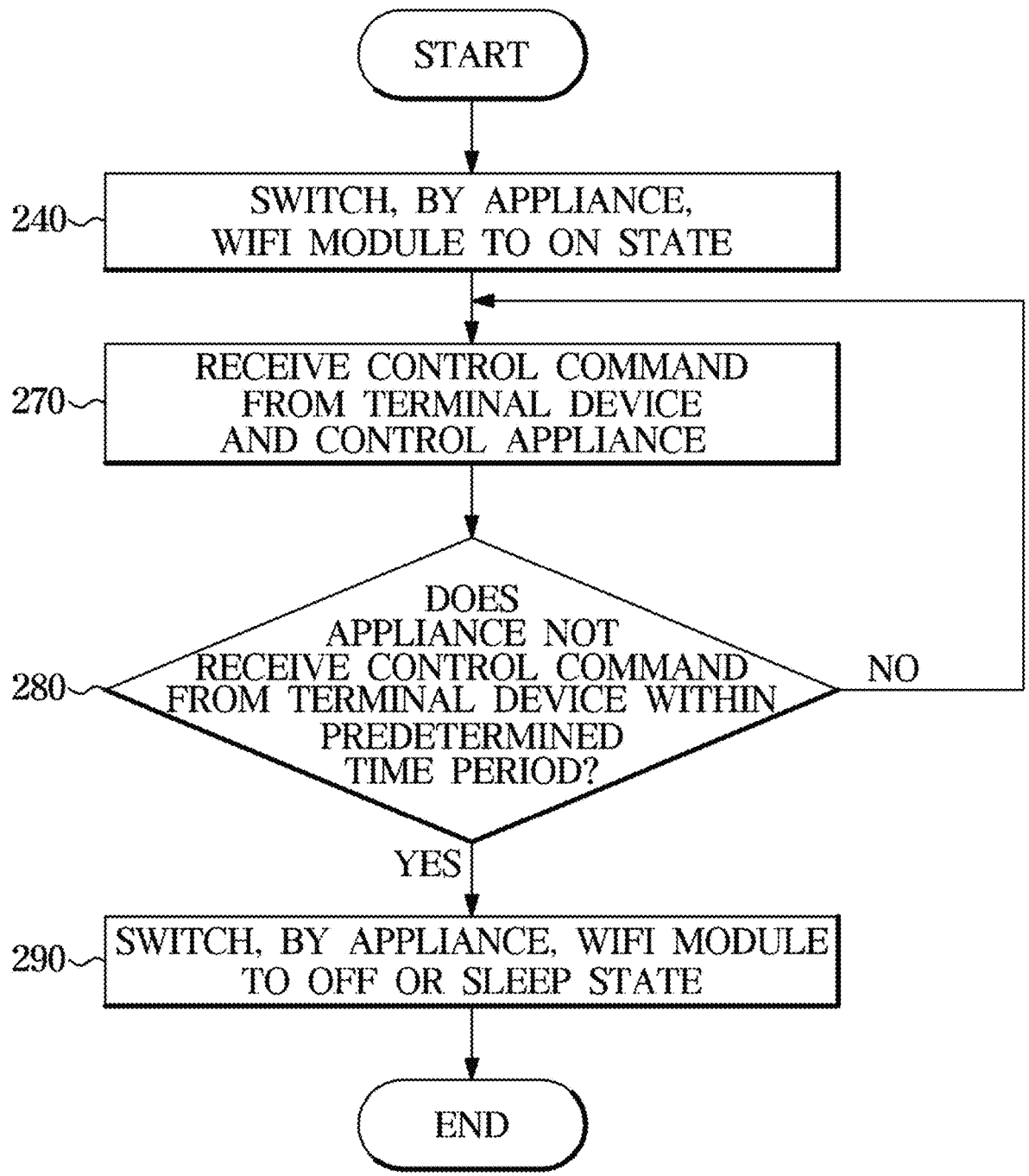
FIG. 8 is a flowchart illustrating a part of a control method of an appliance network system according to various embodiments of the disclosure.

Referring to FIG. 8, the appliance 10 may receive a wake-up signal through Bluetooth communication and turn on the WiFi module 12 (operation 240). The appliance 10 with the WiFi module 12 turned on may access the WAN 60 through the AP 30 or the hub device 20 to perform wide area communication and may receive an appliance control command from the terminal device 50 through WAN via the server 40. That is, the appliance 10 may receive an appliance control command from the terminal device 50 and control the appliance 10 (operation 270). The controller 13 of the appliance may identify whether the appliance 10 does not receive an appliance control command from the terminal device 50 within a predetermined time period, and in response to the predetermined time not elapsing, maintain the WiFi module 12 of the appliance 10 in an on state ("No" in operation 280).

In response to the appliance 10 not receiving an appliance control command from the terminal device 50 within the predetermined time ("Yes" in operation 280), the controller 13 of the appliance may switch the WiFi module 12 of the appliance 10 to an off state (operation 290).

In addition, in response to cancelling connection of the terminal device 50 from the appliance 10, the server 40 may transmit, to the appliance 10, information indicating that the terminal device 50 has cancelled the connection, and the controller 13 of the appliance 10 may switch the WiFi module 12 of the appliance 10 to an off state based on the connection cancellation information.

That is, the appliance 10 according to certain embodiments may maintain the WiFi module 12 in an ON state only when needed to receive an appliance control command from the terminal device 50 using the WAN 60, so that the power consumed to maintain the WiFi module 12 in an on state may be reduced. To this end, the appliance 10 needs to maintain the Bluetooth module 11 in an on state to prepare for receiving a wake-up signal from the hub device 20, but because Bluetooth low energy signals require extremely little power compared to WiFi signals, the standby power of the appliance 10 may be minimized.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

Although the present disclosure has been described with various embodiments, various changes and modifications may be suggested to one skilled in the art. It is intended that the present disclosure encompass such changes and modifications as fall within the scope of the appended claims.

What is claimed is:

1. An appliance comprising:
a WiFi module configured to perform wireless fidelity (WiFi) communication with an access point (AP) and communicate with a terminal device through the AP;
a Bluetooth module configured to perform Bluetooth communication with a Bluetooth device, wherein the Bluetooth device is configured to transmit a wake-up signal to the appliance in response to receiving an appliance control command transmitted from the terminal device; and
a controller configured to, in response to receiving the wake-up signal by the Bluetooth module, turn on the WiFi module in an off state.

2. The appliance of claim 1, wherein the controller is configured to, upon the WiFi module not receiving the appliance control command from the terminal device within a preset time, turn off the WiFi module.

3. The appliance of claim 1, further comprising a storage, wherein:
the controller is further configured to, while increasing or decreasing a strength of a Bluetooth signal output by the Bluetooth module, determine a minimum value of the Bluetooth signal at which the Bluetooth module is connected to the Bluetooth device, and
the storage is configured to store the determined minimum value of the Bluetooth signal.

4. The appliance of claim 3, wherein the controller is further configured to:
upon a connection of the Bluetooth module to the Bluetooth device, decrease the strength of the Bluetooth signal output by the Bluetooth module, and
upon a cancellation of the connection between the Bluetooth module and the Bluetooth device during the decreasing of the strength of the Bluetooth signal, increase the strength of the Bluetooth signal output by the Bluetooth module.

5. The appliance of claim 4, wherein the controller is further configured to, upon a connection of the Bluetooth module to the Bluetooth device during the increasing of the strength of the Bluetooth signal, determine the strength of the Bluetooth signal output by the Bluetooth module as the minimum value.

6. The appliance of claim 5, wherein the controller is further configured to, upon a connection of the Bluetooth module to the Bluetooth device during the increasing of the strength of the Bluetooth signal, maintain the strength of the Bluetooth signal output by the Bluetooth module.

7. The appliance of claim 3, wherein the controller is further configured to determine a value of strength for the Bluetooth signal output by the Bluetooth module based on a plurality of values of strength for the Bluetooth signal stored in the storage.

8. The appliance of claim 7, wherein the controller is further configured to control the Bluetooth module to output the Bluetooth signal having the determined value of strength.

9. An appliance network system comprising:
a terminal device;
a server configured to:
receive an appliance control command from the terminal device, and
transmit the received appliance control command to a hub device;

the hub device configured to, in response to receiving the appliance control command from the server, transmit a wake-up signal to an appliance through Bluetooth communication; and the appliance including a wireless fidelity (WiFi) module and a Bluetooth module, and is configured to, in response to the Bluetooth module receiving the wake-up signal from the hub device, turn on the WiFi module in an off state.

10. The appliance network system of claim 9, wherein the appliance is further configured to, in response to not receiving the appliance control command from the terminal device within a preset time, turn off the WiFi module.

11. The appliance network system of claim 9, wherein the appliance is further configured to turn on the WiFi module to receive a WiFi signal from the hub device or an access point (AP).

12. The appliance network system of claim 11, wherein the hub device is provided with an AP module to serve as an AP.

13. The appliance network system of claim 9, wherein the appliance is located within a preset radius based on the hub device.

14. The appliance network system of claim 9, wherein the appliance is further configured to maintain the Bluetooth module in an on state.

15. A connection method of an appliance network, the connection method comprising:

transmitting, by a terminal device, an appliance control command to a server;

transmitting, by the server, the appliance control command received from the terminal device to a hub device;

receiving, by the hub device, the appliance control command from the server;

transmitting, by the hub device, a wake up signal to an appliance through Bluetooth communication;

receiving, by the appliance including a wireless fidelity (WiFi) module and a Bluetooth module, the wake up signal from the hub device through the Bluetooth module; and turning on, by the appliance, the WiFi module from an off state in response to receiving the wake up signal.

16. The connection method of claim 15, further comprising, in response to the appliance not receiving the appliance control command from the terminal device within a preset time, turning off the WiFi module.

17. The connection method of claim 15, further comprising turning on, by the appliance, the WiFi module, to receive a WiFi signal from the hub device or an access point (AP).

18. The connection method of claim 17, wherein the hub device is provided with an AP module to serve as an AP.

19. The connection method of claim 15, wherein the appliance is located within a preset radius based on the hub device.

20. The connection method of claim 15, wherein the appliance is configured to maintain the Bluetooth module in an on state.

* * * * *